(12) United States Patent
Berg

(10) Patent No.: US 11,771,984 B2
(45) Date of Patent: Oct. 3, 2023

(54) VARIABLE LATENCY COMPENSATION FOR ASYNCHRONOUS MULTIPLAYER GAMES

(71) Applicant: Amazon Technologies, Inc., Reno, NV (US)

(72) Inventor: Karl Berg, Barnaby (CA)

(73) Assignee: Amazon Technologies, Inc., Reno, NV (US)

( * ) Notice: Subject to any disclaimer, the term of this patent is extended or adjusted under 35 U.S.C. 154(b) by 8 days.

(21) Appl. No.: 17/194,876

(22) Filed: Mar. 8, 2021

(65) Prior Publication Data

US 2021/0291050 A1    Sep. 23, 2021

Related U.S. Application Data

(63) Continuation of application No. 15/795,928, filed on Oct. 27, 2017, now Pat. No. 10,940,388.

(51) Int. Cl.
*A63F 13/358* (2014.01)
*A63F 13/56* (2014.01)

(52) U.S. Cl.
CPC ............ *A63F 13/358* (2014.09); *A63F 13/56* (2014.09)

(58) Field of Classification Search
CPC .................................................. A63F 13/358
See application file for complete search history.

(56) References Cited

U.S. PATENT DOCUMENTS

| | | |
|---|---|---|
| 6,402,618 B1 | 6/2002 | Reed |
| 7,293,235 B1 | 11/2007 | Powers |
| 8,678,929 B1 * | 3/2014 | Nishimura ............ A63F 13/798 463/31 |
| 8,944,908 B1 | 2/2015 | Wakeford |
| 9,168,459 B1 | 10/2015 | Delaet |
| 9,205,338 B1 | 12/2015 | Wakeford |
| 9,224,259 B1 | 12/2015 | Miller |
| 2002/0142843 A1 | 10/2002 | Roelofs |
| 2007/0070914 A1 | 3/2007 | Abigail |

(Continued)

OTHER PUBLICATIONS

Non-Final Rejection issued in U.S. Appl. No. 15/795,928 dated Jul. 8, 2019.

(Continued)

*Primary Examiner* — Jay Trent Liddle
(74) *Attorney, Agent, or Firm* — HOGAN LOVELLS US LLP

(57) ABSTRACT

A gameplay aspect, such as a hit volume, can be determined for a player-controlled gameplay element based at least in part upon a variance in input packet receipt timing. For games such as asynchronous multiplayer games where client devices are authoritative with respect the passage of time, players can obtain an unfair advantage but adjusting the timing of the input packets sent for those players. In order to address this potential unfairness, a hit volume for a player character can be increased in size according to the amount of timing variance, such that the player cannot avoid interactions as a result of the variation. A velocity vector can be used to sweep the hit volume in the direction of the velocity vector, and the variance can be used to increase the magnitude of the vector in order to expand the size of the hit volume for that gameplay object.

20 Claims, 8 Drawing Sheets

(56) References Cited

U.S. PATENT DOCUMENTS

2015/0038234 A1* 2/2015 Bojorquez ............ A63F 13/358
       463/42
2019/0329129 A1* 10/2019 Fajt ..................... A63F 13/57
2019/0379765 A1* 12/2019 Fajt ..................... A63F 13/55

OTHER PUBLICATIONS

Final Rejection issued in U.S. Appl. No. 15/795,928 dated Jan. 24, 2020.
Non-Final Rejection issued in U.S. Appl. No. 15/795,928 dated Jun. 26, 2020.
Notice of Allowance issued in U.S. Appl. No. 15/795,928 dated Nov. 5, 2020.

* cited by examiner

VARIABLE LATENCY COMPENSATION FOR ASYNCHRONOUS MULTIPLAYER GAMES

CROSS REFERENCE TO RELATED APPLICATIONS

This application is a continuation of, and accordingly claims the benefit of, allowed U.S. patent application Ser. No. 15/795,928, filed on Oct. 27, 2017, which is hereby incorporated herein by reference.

BACKGROUND

The widespread adoption of a variety of computing devices has resulted in a corresponding increase in the variety of gaming options available to players. Many of these games enable users to engage in online multiplayer games, which may be hosted by a central gaming server. Because users can have a variety of different network connections with different transmission speeds, for example, it can be difficult to provide accurate gameplay as it may take a significant amount of time for player data to pass from a player's device, to the central server, and then propagate out to the devices of the other players. Further complicating the matter is the fact that the various client devices are the authorities with respect to game input, such that the game session relies upon accurate and reliable data from the various client devices. This has been exploited by various players, as specialized hardware or software can sit between the client and the game host that can jitter the input packet send rate from the client. Combining the packet jitter with the smoothing functions used in most multiplayer games can provide the player with an unfair advantage, as the actual position of the player can be very different from the displayed location based upon the timing of the input packets as modified by the smoothing function.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for execution and management of electronic gaming applications. In particular, various approaches determine a gameplay aspect, such as a hit volume, for a player-controlled gameplay element based at least in part upon a variance in input packet receipt timing. For games such as asynchronous multiplayer games where client devices are authoritative with respect to aspects such as the passage of time, players can attempt to obtain an unfair advantage but adjusting the timing of the input packets sent from those devices. In order to account for and effectively remove this advantage, a hit volume for a player character can be increased in size according to the amount of timing variance, such that the player cannot avoid interactions through the variation in timing and corresponding display location as may be determined by a smoothing function or other such approach. A velocity vector can be used to sweep the hit volume in the direction of the velocity vector, and the variance can be used to increase the magnitude of the vector in order to expand the size of the hit volume for that gameplay object.

Various other functions can be implemented within the various embodiments as well as discussed and suggested elsewhere herein.

Figure 1A:
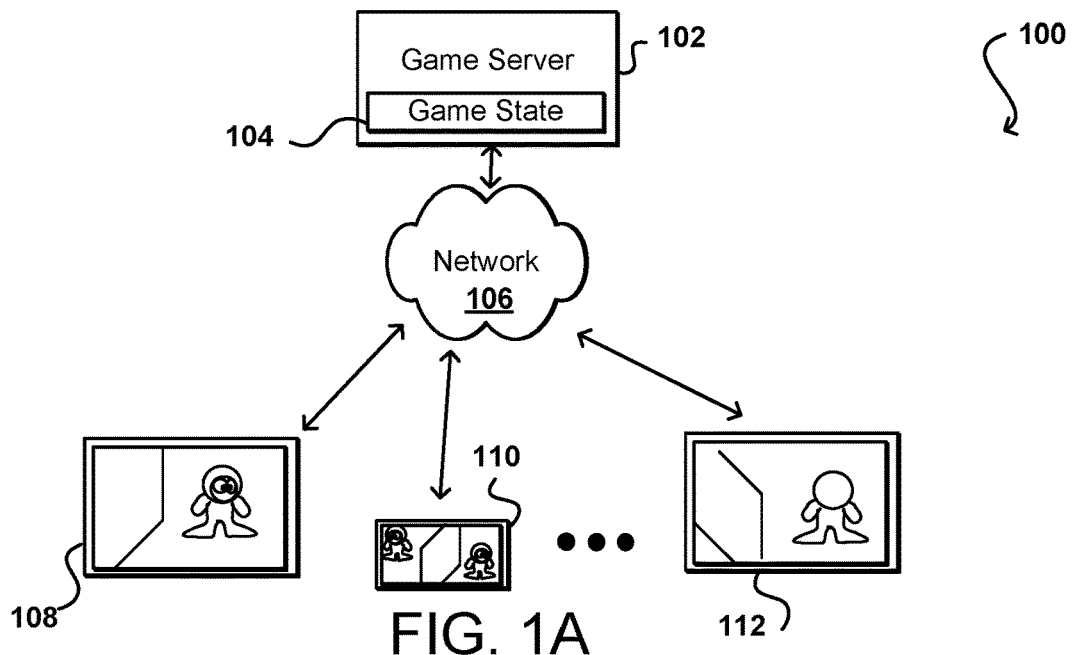
FIGS. 1A, 1B, and 1C illustrate example gameplay for a multiplayer game that can be processed in accordance with various embodiments.

FIG. 1A illustrates an example gaming configuration 100 that can be managed in accordance with various embodiments. In this example, a gaming session is hosted on at least one game server 102. The game server 102 can be a local gaming machine or a remote server operated by a game provider, among other such options. In this example the game offers multiplayer capability, whereby multiple players can utilize respective devices 108, 110, 112 to connect to the game server 102 over at least one network 106, such as the Internet, a local area network, a dedicated gaming network, a peer-to-peer network, or a cellular network, among other such options and combinations thereof. The players can join in a session of the game with state data that is managed by a game state component 104 of the game server. In some embodiments one or more game servers 102 can execute the game, while in others the servers can manage game state for instances of the game executing on the various player devices 108, 110, 112, among other such options. These devices can include specific gaming devices, such as gaming consoles or handheld consoles, or other computing devices such as smart phones, tablet computers, wearable computers (e.g., smart glasses or watches), desktop or notebook computers, and the like. State information can be transmitted to the gaming server 102 at appropriate times, such as periodically, in response to certain actions or occurrences in the game, in response to requests from the server, or at other appropriate times. The game server can maintain the state information such that the game state is consistent across the various devices, as well as to enable a saving or restoring of the game for any or all of the devices.

In many instances, a first player will submit a request to join a session of a specified gaming application supported by the game server 102. If there is an existing game session for which the player qualifies, such as by having an appropriate skill level or qualification, then the player can be added to the existing game session. If there is no existing game session for which the player qualifies, or if games can only be joined before the session starts, then the request can trigger the initiation of a new session for the game. In some embodiments the new session can begin immediately, while in other embodiments or for specific games there might need to be a specified number, minimum number, or quorum of players for a session before the session can begin. For example, if a game requires ten players then a session might not start before ten players have joined, with the first nine players having to wait at least until a tenth player joins. In some cases additional players can join during a session, such as up to a maximum number of players in some embodiments, while in others players may not be able to join, or may only be able to join if a current player leaves the session, etc.

In many situations, the player devices will be at different geographical locations. In order to ensure that all the game state information utilized by the player devices is accurate, player input in many cases will be transmitted from the individual player devices to the relevant game server 102, such that the game state can be updated by the game state manager 104, and the updated game state information can be propagated to the various player devices such that the devices are all utilizing consistent game state information. The game state information can include, for example, position and orientation information for the players and objects in the game, as well as gameplay data for actions being performed in the game environment by any of the players or other gameplay elements. Such an approach can result in difficulty managing state for the game, however, as any instance of player data must be transmitted from the respective player device to the server, and sent back to the relevant gaming devices. Since players can have various types of network connections with differing speeds, including cellular and landline-based connections, there can be significant latency involved in getting gameplay data from one player device to another. For games such as real time, multiplayer online video games, this latency can have a meaningful, negative impact on gameplay. For example, if the game involves throwing a ball or shooting a paint gun, a first player might direct the action towards a last known location received for a target player. The action will be likely to miss, as the other player may have moved since the last received location such that the first player may see the action take place but the action will actually fail because when the game state data is synchronized the target player will actually not have been in that location. The game server then might have to retract the apparently completed action, or wait to determine whether the action is successful, either of which can significantly degrade the gaming experience.

Figure 1B:
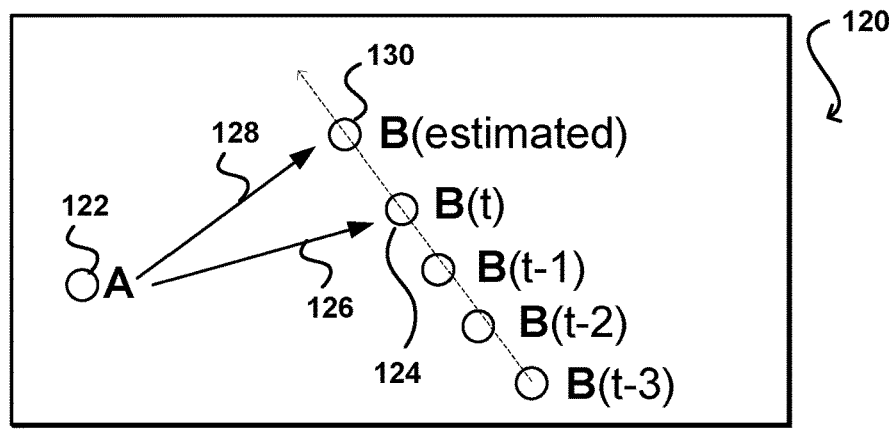

In an attempt to manage the issues with latency, many conventional gaming services implement static gameplay prediction logic. Traditionally this prediction logic is manually generated by a developer around a set of player data. In one example, the prediction can be a linear extrapolation using a player's prior positions, including a rate or type of movement. This can then be used to determine both the direction and the speed, along with other factors such as a maximum speed of a type of character and other such data. FIG. 1B illustrates results 120 of such a prediction model that can be utilized in accordance with various embodiments. In this example, a first player 122 (Player A) is at a first position in an overhead view of the gameplay location. A second player 124 (Player B) is at a second location in the overhead view. This corresponds to the last position reported for Player B as received to a device corresponding to Player A. If player A throws a ball to Player B at the last reported position 124, along a given trajectory 126, the throw would miss because at the time the ball arrives in the game Player B is at a different actual location. In order to have the game appear to be in real time, the game could use the last reported position 124 which would show that the ball was successfully delivered, but would then have a problem when the synchronized gameplay data shows the player actually moved to a current actual location. By the time the action data gets to the device of Player B, the trajectory 126 would have caused the ball to miss Player B. There would be difficulty in reconciling the two local gameplay states after the fact.

As mentioned, an approach to minimizing the latency impact, resulting in events happening at different times on different devices, involves attempting to predict the location of Player B at a near future point in time, and make determinations based on the predicted location(s) instead of the last reported location. For example, the position data in FIG. 1B shows the last reported position 124 of Player B, as well as the three prior locations with associated timestamps or time data. Based on the current location and the recent prior locations, a future prediction can be extrapolated by a fitting a linear function, curve, or exponential function, etc., to the set of recent points. This can include a time component as well in at least some embodiments. In this example, a linear extrapolation (or interpolation) is applied to the recent location points to determine a predicted future location 130 of Player B based on Player B's recent movement and information known about the game, the type of character controlled by Player B, and other such information. In this way, Player A would be determined to successfully target Player B by throwing the ball along a different trajectory 128, which would arrive at the predicted location 130 at the associated time.

Figure 1C:
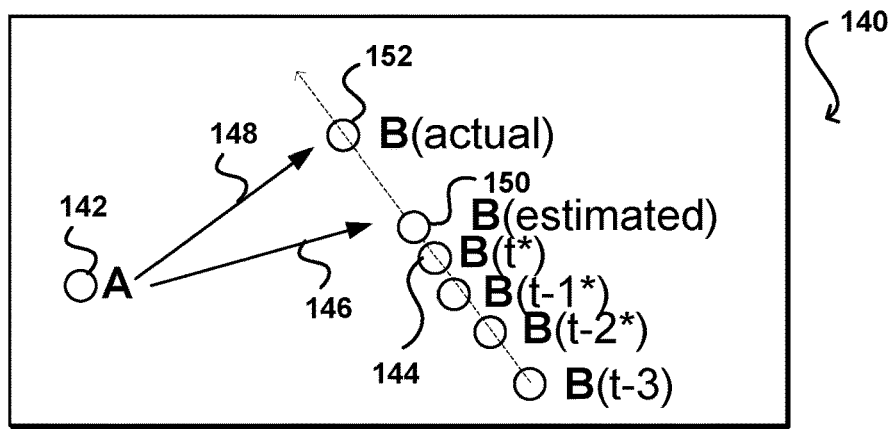

As mentioned, however, the position data determined for asynchronous multiplayer games is determined in large part by information from the client device, which leaves it open to modification on the client, or between the client and the game host. This can enable a player to attempt to gain a competitive advantage through modification of the timing of input packets received to the game host. For example, FIG. 1C illustrates position determination results 140 for the same input data as in FIG. 1B. In this example, however, the timing of the packets has been altered such that the input appears to correspond to different points in time. As mentioned, a smoothing function can be used to attempt to prevent jitter in the displayed location of various player-controlled gameplay elements, such that the movement of the element will be smoothed over time based on the input data. If the position 144 of the player character element is displayed at the same times as in FIG. 1B, it can be seen that the interpreted position data is different. Based on this information, both the displayed position and estimated position 150 of the player character element will differ significantly from the actual position 152 as determined authoritatively by the respective client device. This provides a significant advantage to that player, as the other players can take action based on where the player is displayed to be located in the game, but the actual actions or occurrences in the game will be based on the actual position at those times. Thus, in a paint ball game a player will be difficult to hit because the displayed location may be very different from the actual authoritative location.

There are approaches other than extrapolation that can be used to account for the latency issues as well. For example, instead of extrapolating forward entities on the clients' screens, the machine (or server) hosting the simulation can reconstruct the configuration of entities as they existed on the clients screens. This can be accomplished in some embodiments by effectively "rewinding" the world every time an action is processed on the game. Extrapolation can suffer from incorrect predictions and gameplay that seems to stretch or bend as network conditions deteriorate, so it is not frequently used within the industry. Accordingly, at least some of the embodiments discussed herein can utilize a 'host-state-rewind' or 'backward reconciliation' approach to compensate for the effects of latency on the server, without extrapolation on the client. When using such an approach, it can be important for at least some implementations that all the client machines and server machine(s) participating in the simulation perform the same hit volume alterations for predictive and authoritative input processing to agree.

In many gaming environments, the networking algorithms utilized can attempt to minimize and constrain the set of client authoritative inputs to the smallest subset possible. There remain certain inputs, implicit or explicit, that may not be able to be removed from client authority. For example, user input received through a device or mechanism that is part of, or otherwise connected to, the client device will generally be user authoritative, as may include devices such as a keyboard, mouse, gamepad, speaker, motion input, wearable computer, or gaming headset, among other such options. Other client-authoritative inputs, at least within an edge-triggered asynchronous multiplayer environment, can include inputs related to the passage of time, as well as potentially the smoothness of which time passes for a client's autonomous entity. Since the receipt of an input packet in an asynchronous multiplayer game results in a stepping or integrating of the corresponding player forward in time, the client devices have gained implicit authority over the passage of time at least with respect to their character or other player-controlled gameplay element(s).

Approaches can be utilized that can bank time for various player devices, thereby constraining the window of time over which a client device can maintain authority. It is still possible, however, for malicious clients to jitter their input packet send rate within the bank time window, such as by using specialized software or hardware that sits between the client device and the host machine. As mentioned, the jittering can allow the client device, or a player utilizing that client device, to gain unfair advantage in networked competitive play. This exploitable mechanic is exacerbated by the inherent smoothing built into networking layers of various games, whose job is to hide variance in latency from players in order to achieve a visually pleasing game experience. This smoothing allows the representation of a malicious client to deviate from the true networked position of that client by a large enough factor to negatively impact gameplay, at least with respect to the other players for a gameplay session involving the malicious client.

Accordingly, approaches in accordance with various embodiments can counteract the inherent advantages of clients that are exploiting such a mechanic. By eliminating the competitive advantage that can be achieved by jittering input packet send frequency, the motivation to purposefully exploit this form of client authority is significantly reduced. It can be a significant goal of at least some implementations to disadvantage players by an amount equal to the advantage gained by manipulation of their connection. As part of such an approach in accordance with various embodiments, a metric can be computed for the various of input packets received from any client connection. One approach to computing connection variance involves the use of a sliding window of timestamps for received packets. By computing the differences of received packets from the expected arrival times, the variance or standard deviation of that particular client connection can be computed with respect to an "ideal connection" that experiences zero variance in connection latency.

Such an approach can also attempt to increase a gameplay aspect such as an attackable hit volume for a player, or an effective interaction boundary for a player-controlled object or element (e.g., an avatar or playable character) within the game. Hit volumes are typically driven by the inputs of a player, as those are transformed into first and second derivative values (angular and linear velocities and accelerations) that are integrated to move a gameplay element, such as the avatar for a player in the game, as well as the set of animations, blend weights, and phases that drive the animation of that avatar as it moves around the scene or gameplay level, etc. In at least some embodiments, the velocity for the player element in question is accessed and utilized in order to have the ability to sweep the hit volumes of that character, over time, by a scalar amount or factor of the velocity vector. Hit volumes are frequently convex volumes in conventional games, and conventional collision detection systems often utilize a Minkowski Sum-based implementation such as a Gilbert-Johnson-Keerthi (GJK) algorithm or Minkowski Portal Refinement, sweeping a hit volume can involve plugging the sweep vector into the support function for that shape, computing the support at both endpoints of the support vector, and taking the maximum of the two (a simple dot product). As known in the general field, a Minkowski sum or dilation of two sets of position vectors in Euclidian space is the result of the addition of each vector in A to each vector in B. Such an approach can effectively stretch the attackable hit volume of that character at least along the direction of travel.

Once a metric for connection variance is obtained, and a mechanism for sweeping hit volumes along velocity vectors is available, these two actions can be used to scale the sweep for the hit volumes of a character element by an amount related (e.g., linearly) to the variance of the gaming connection. The precise amount of scaling to be used to counteract the competitive advantage of jittering input packets can be game-specific in some embodiments, as the amount may also relate to factors such as controls for aiming, attack speeds, available movements, and rates at which an actor can accelerate in the particular game, among other such factors.

Figure 2A:
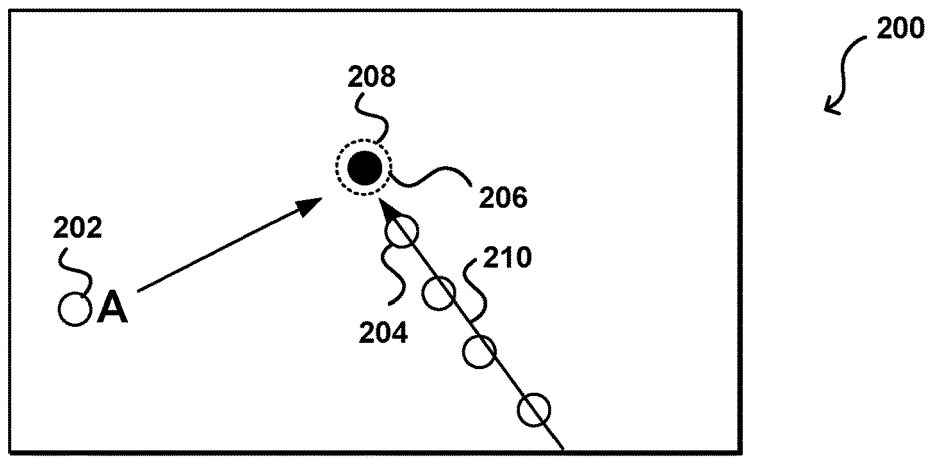
FIGS. 2A, 2B, and 2C illustrate example hit box volumes that can be determined for player position in accordance with various embodiments.
Figure 2B:
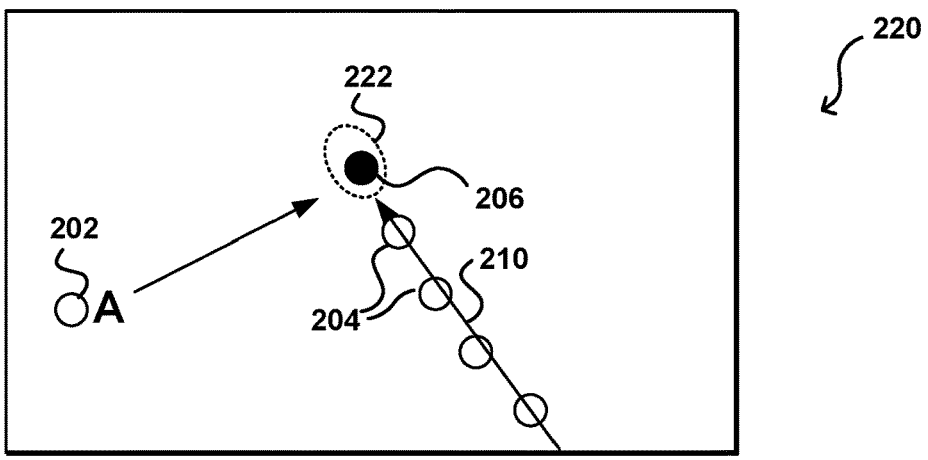
Figure 2C:
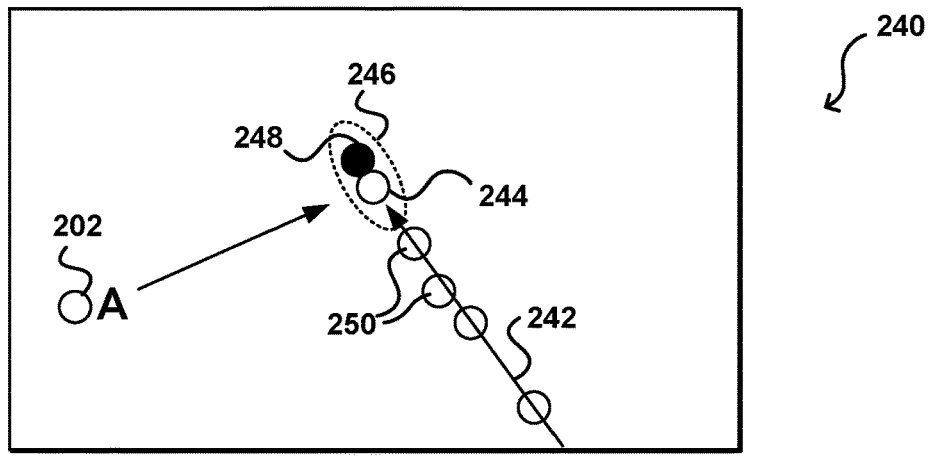

As an example, the situation 200 of FIG. 2A illustrates an example case wherein a hit volume 206 is generated for an expected player position, as may be based upon a path of travel 210 along two or more previous locations at recent points in time, as may correspond to the last few received input packets from the corresponding client device. This example does not take into account the existing rate of motion, and only generates the hit volume 208 based on the predicted (or smoothed) position 208 of the gameplay element. Such an approach does not take into account the current velocity of the gameplay element, as well as the ability to accelerate or decelerate from that velocity, which can result in a greater distribution of potential future positions. Accordingly, a velocity-dependent approach can be utilized as illustrated in the example situation 220 of FIG. 2B, wherein the hit volume is stretched along the direction of movement by a factor related to the velocity of the gameplay element. The velocity, as well as the potential acceleration and deceleration, can be processed by a physics engine of the game to determine predicted locations of the gameplay element at one or more future periods of time, along with confidence values or other such metrics. This allows for some flexibility in the ability of another player element 202 to hit or otherwise interact with the gameplay element even though the displayed position 206 from the prediction and/or smoothing might be at a different location than the actual or authoritative location. As illustrated, the hit volume 222 around the predicted position is stretched along the direction of the path of motion 210 at that point.

As mentioned, the ability to vary or jitter the timing of the input packets can further impact the potential locations, as the timing for various input or position data can be adjusted, whereby the determined location and/or velocity of the gameplay element can be different from the authoritative data. Thus, a player element may appear to not only be in a different location, but moving with a different velocity, which can significantly impact the predictions when smoothing is applied. Accordingly, the stretching of the hit volume 246 can be increased by a factor relating to the variance in the timing, to allow for the potential increase in difference between the predicted location 244 and authoritative location of the gameplay element. In some embodiments, the stretched hit volume will provide at least the same margin for error with respect to a potential location of the gameplay element as if the element was not in motion.

In some embodiments scalar values can be computed for specific games, or types of games. As an example, a set of controlled experiments can be performed where players of known skill ratings (e.g., ratings provided using a skill rating system such as Elo) play against each other repeatedly with different variable latency factors. Using the known skill ratings, Elo will predict percentage probabilities for each player to win. Given enough samples, the actual win rates across various variable latency settings can be compared against the theoretical win rates. An estimated scalar factor can then be used to inversely affect win rates. Using any search algorithm, binary search can be used to minimize the number of sample games required, the scalar value can be adjusted until expected and actual win rates match. At this point, a data driven value to compensate for the skill advantage provided by variable latency may have been obtained. Such a value can be improved by increasing the sample size used to increase confidence.

In various embodiments, the latency is minimized to the extent possible in the networking stack to improve gameplay, as additional latency generally decreases the enjoyment in multiplayer games. There can be additional contradictory situations in a game as the latency increases. In order to minimize total latency, packet streams such systems process the packets as fast as possible, but a small window is allowed around the delivery of the packets to allow for varying network connection conditions. Requiring consistent packet delivery could improve the gameplay experience, but would reduce the number of potential players to only those who have such connections and devices available. If the packets are too tightly bunched then that can eat into the amount of available window, and if the packets are spread too far apart then they can fall outside the window. Such an algorithm can essentially measure the variance of their connection. Once a metric for the variation in latency is obtained, that metric can be used to scale the hit volume for the relevant gameplay element(s) as discussed above. The hit volume can also be extended along the direction of motion corresponding to the variance in packet receipt. The actual, authoritative position is not displayed to players in many games, but the predicted and/or smoothed position to make the game visually appealing and reduce jitter in the animation.

Figure 3A:
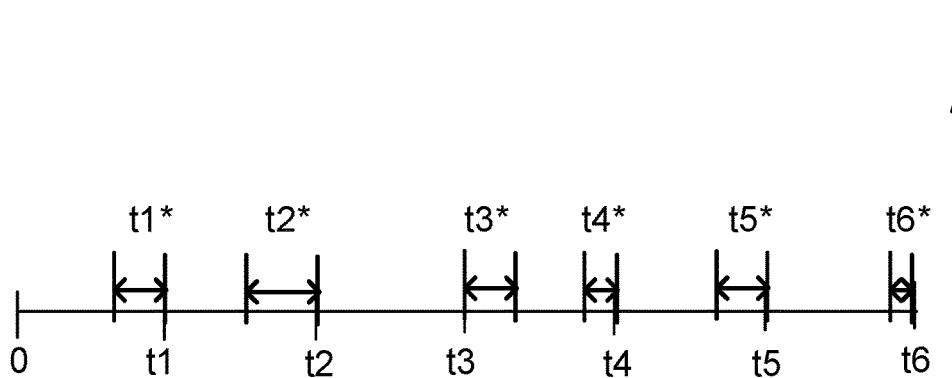
FIGS. 3A, 3B, and 3C illustrate an example variation in hit box volume with velocity and timing variance that can be utilized in accordance with various embodiments.
Figure 3B:
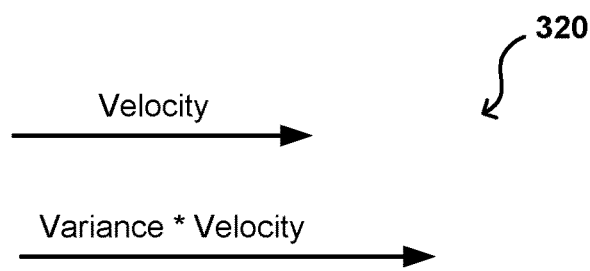
Figure 3C:
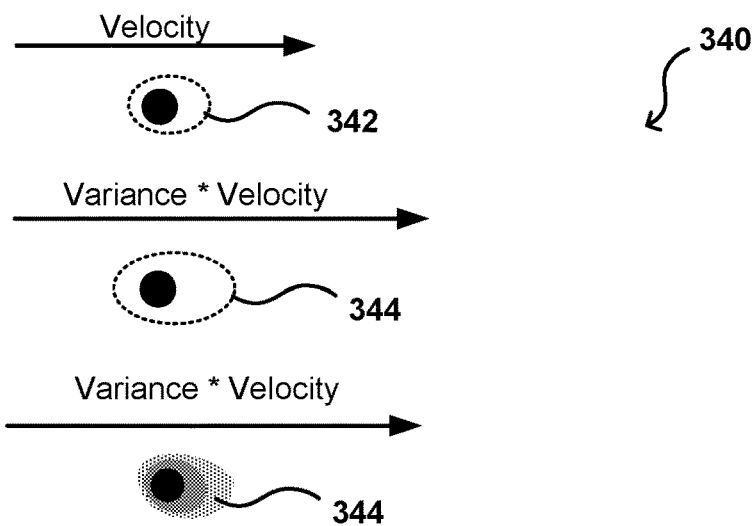

As illustrated in the example approach 300 of FIG. 3A, the "ideal" timing of packets received for a game can be determined, based upon experimental or actual connection data, among other such options. Although illustrated as a timeline, it should be understood that the timing can be between the receiving of individual packets and not related to that of prior packets in at least some embodiments. This timeline is meant to show the differences (t1*, t2*, etc.) from the timing of actual received packets to the expected times (t1, t2, . . . ) for those packets. As illustrated, the jitter can correspond to both longer and shorter packet intervals, of differing magnitudes. Accordingly, a variance from the ideal length can be determined, using approaches discussed herein, to provide a metric for the packet jitter than can be used to adjust the hit volumes or other aspects of player-controlled gameplay elements. As illustrated in the example 320 of FIG. 3B, a first vector can be generated that is representative of the motion and velocity of the respective gameplay element in the game. This vector can then be extended by a factor relating to the variance as discussed herein. In some embodiments, the velocity factor would never be reduced by such an approach, and can only be extended due to the presence of jitter in the packet timing. As illustrated in the example 340 of FIG. 3C, a first hit volume 342 can be extended based on the direction and magnitude of the velocity. The volume can further be extended 344 based upon the vector extended by the variance factor. In some embodiments the volume may not be a rigid boundary around the gameplay element, but may be a distribution 344 based on confidence level or other such metrics, which can be combined with an accuracy or other metric of an interaction to determine whether the interaction should occur or be registered for a particular position in the game.

A gaming server in one embodiment can be responsible for managing game state information for at least one gaming session. The server can collect game information from all players, or player devices or applications, for a current gaming session, and can aggregate and correlate the data to generate a current set of game state data based upon the inputs or actions of the various players. This information can then be propagated to the various clients for use in updating game state data, as well as predicting future game state data. The gaming server can also collect other data useful in predicting player action, as may relate to the various latencies from different client devices, which may provide an indication of the delay for each player and the type or amount of prediction needed for that player, where the amount of prediction may vary by player. In some embodiments the amount of prediction may be the same but the actual data may be reconciled more quickly for players with faster connections. The game server in some embodiments can also provide this and other game state information (such as performance statistics and the like) to a master database or game repository, to which all other game servers may also send similar data.

Figure 4:
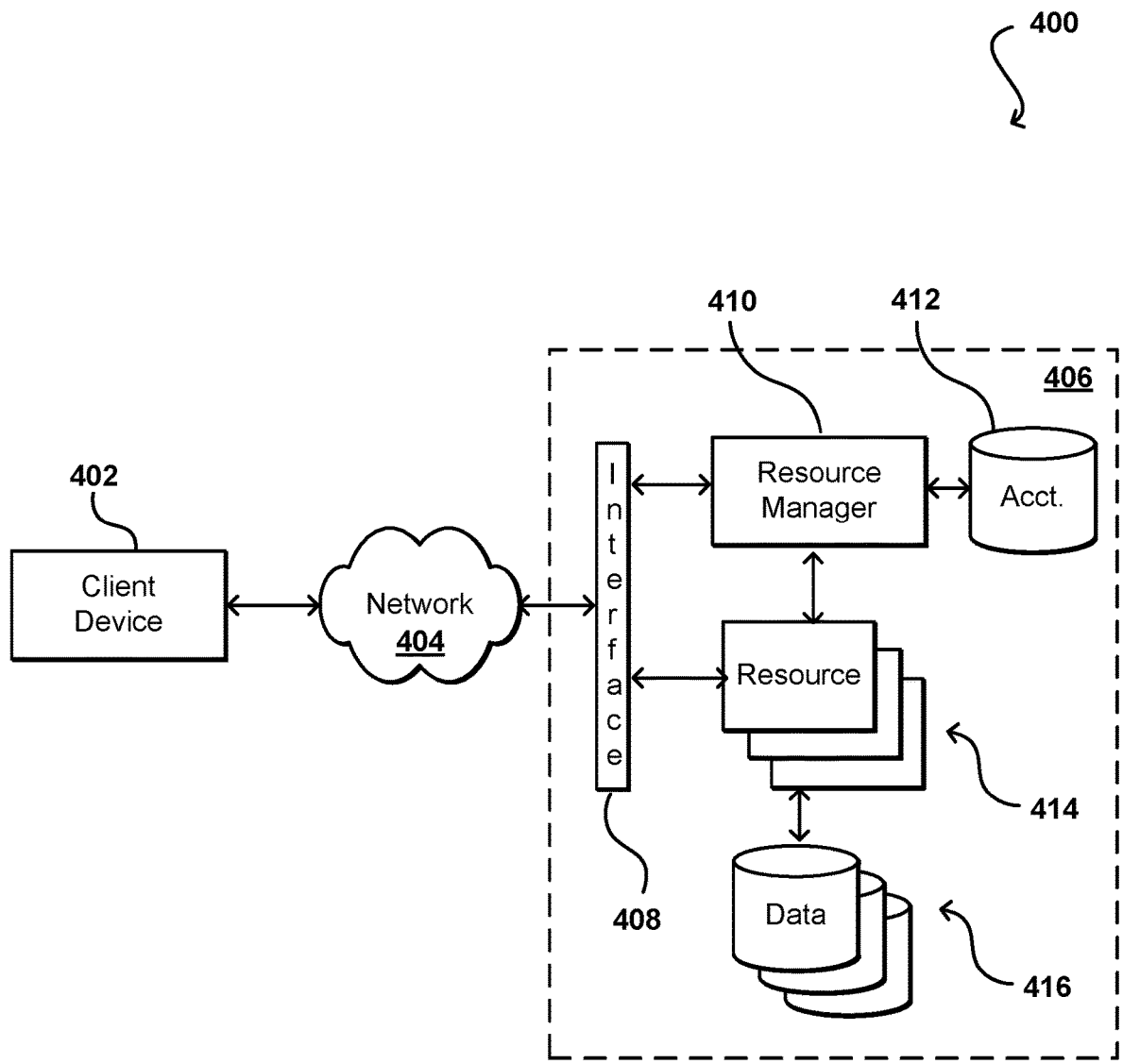
FIG. 4 illustrates an example environment in which various embodiments can be implemented.

FIG. 4 illustrates an example environment 400 in which aspects of the various embodiments can be implemented. In this example a user is able to utilize a client device 402 to submit requests across at least one network 404 to a multi-tenant resource provider environment 406. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 404 can include any appropriate network, including an intranet, the Internet, a cellular network, a local area network (LAN), or any other such network or combination, and communication over the network can be enabled via wired and/or wireless connections. The resource provider environment 406 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 414 of one or more types. These types can include, for example, application servers operable to process instructions provided by a user or database servers operable to process data stored in one or more data stores 416 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 414 can submit a request that is received to an interface layer 408 of the provider environment 406. The interface layer can include application programming interfaces (APIs) or other exposed interfaces enabling a user to submit requests to the provider environment. The interface layer 408 in this example can also include other components as well, such as at least one Web server, routing components, load balancers, and the like. When a request to provision a resource is received to the interface layer 408, information for the request can be directed to a resource manager 410 or other such system, service, or component configured to manage user accounts and information, resource provisioning and usage, and other such aspects. A resource manager 410 receiving the request can perform tasks such as to authenticate an identity of the user submitting the request, as well as to determine whether that user has an existing account with the resource provider, where the account data may be stored in at least one data store 412 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 402 to communicate with an allocated resource without having to communicate with the resource manager 410, at least until such time as a relevant aspect of the user account changes, the user is no longer granted access to the resource, or another such aspect changes.

The resource manager 410 (or another such system or service) in this example can also function as a virtual layer of hardware and software components that handles control functions in addition to management actions, as may include provisioning, scaling, replication, etc. The resource manager can utilize dedicated APIs in the interface layer 408, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 408 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 5:
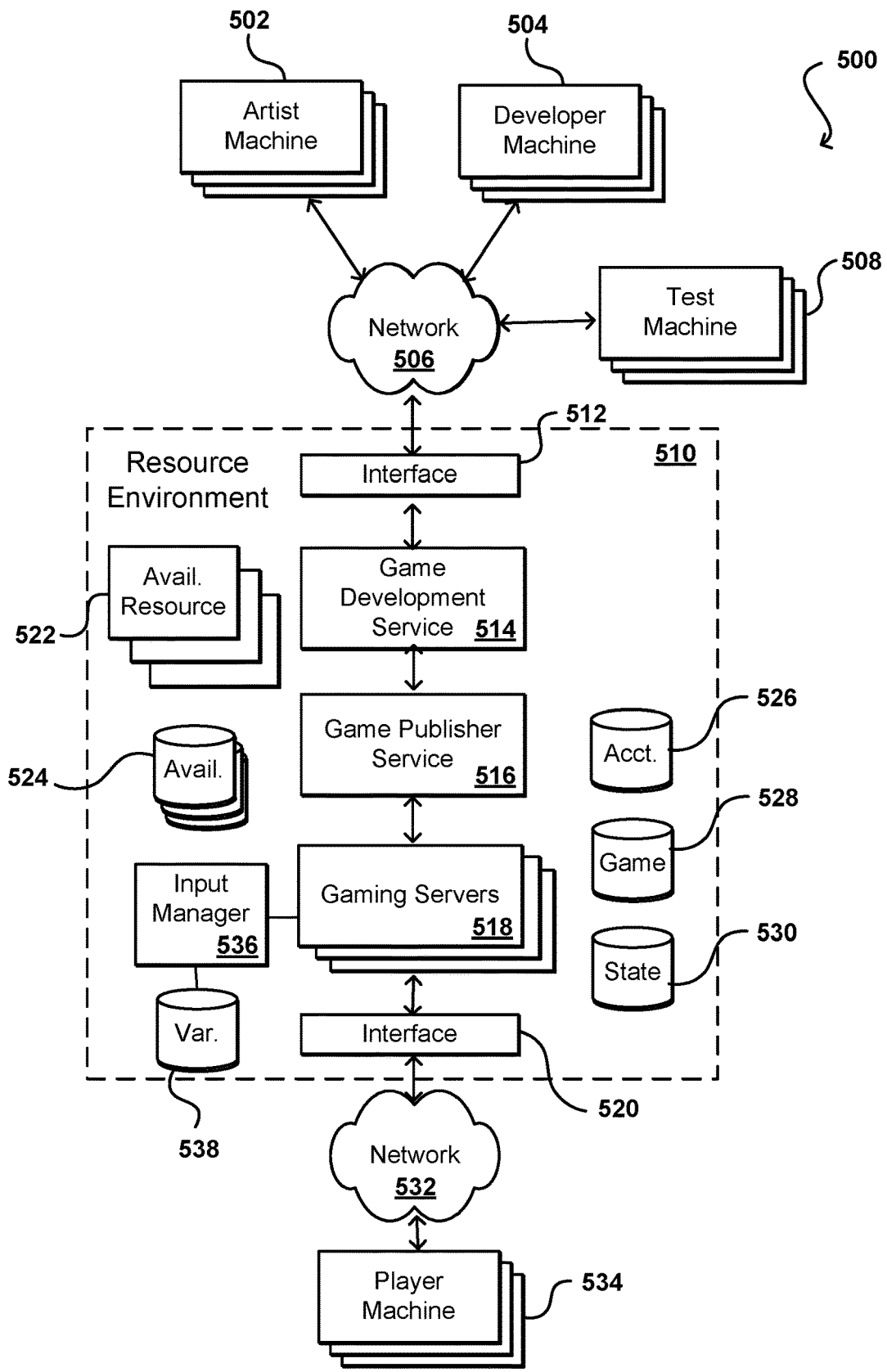
FIG. 5 illustrates an example gaming pipeline that can be used in accordance with various embodiments.

As illustrated in the example system 500 of FIG. 5, at least some of the resources can be used to support platforms and services useful in the development and providing of electronic gaming and three-dimensional graphical content, among other such options. For example, the artist machines 502 and developer machines 504 can collaborate via a game development service 514, which can be provided by a set of resources in the resource environment 510 that are able to scale dynamically as discussed above. It should be understood that artists fall within the group of people referred to herein as "developers," and that the distinction in this figure is to illustrate different types of users and purposes. Unless otherwise specifically stated, developers can include not only code developers, but also artists, game designers, engineers, quality assurance personnel, content creators, musicians, and the like. The game development service can perform tasks such as to enable the checking out or locking of items for a game, the management of game files amongst developers, the providing of tools or templates to use for gaming development, and the like. The development service can also provide communication services such as messaging and content sharing, among other such options. The game development service can store information for a game to at least one game repository 528, where the repositories can include graphics files, code, audio files, and the like. The game development service 514 can also work with an account manager, or at least maintain information in an account data store 526, such that the game development service can determine which resources, including amounts or types of resources, can be allocated on a customer's behalf for the development of one or more customer games or other such content. The account data can also specify which users are authorized to work on the gaming content, including types of content accessible, actions able to be taken, and the like.

Once the game development reaches an appropriate stage in the development cycle or pipeline, as may relate to alpha or beta testing, actual release or updating, etc., the appropriate content can be made accessible to a game publisher service 516. The game publisher service 516 can receive instructions regarding the type of release, format of the release, and other appropriate information, and can cause the game content to be published to an appropriate location for access. While illustrated as part of the service provider environment, it should be understood that components such as the gaming servers or game publisher could be executed on a local user machine as well, whether one of the developer machines 504 or otherwise. In some embodiments the game content might be published and made available to one or more test machines 508, which may be associated with the customer, such that the customer can test various builds or versions of the game. In some embodiments feedback provided by the test machines 508 may be provided to the game development service 514, which can maintain testing feedback or data and make that feedback available, via logs, messages, reports, or other such mechanisms, to the developers or other persons associated with the game development. If the game is to be made available to end users, gamers, or other such persons or entities, the game publisher service might publish the game content to an array of gaming servers 518 which can run the game and enable player machines 534 to access the game content over one or more networks 532, which may be different from the network(s) 506 used for game development. This can include, for example, dedicated gaming networks, the Internet, cellular networks, and the like. The player machines 534 can communicate with the appropriate interfaces of an interface layer 520 to obtain the gaming content. In some embodiments the player machines 532 will download the gaming content for execution on the individual machines, and will upload (or otherwise communicate) gaming data, messages, and other information to the gaming servers 518, as well as to other players, social networking sites, or other such recipients. The gaming servers 518 can cause state information for the various instances of the game to be stored to at least one game state repository. This can hold state for the game as a whole or for individual game sessions, among other such options. In some embodiments the game content can be executed by the game servers and streamed in near real time to the player machines 534. In some embodiments there may alternatively be a mix of gaming content executed on the player machines and the gaming servers. Peer to peer connections among the player machines and other communications can be utilized as well in various embodiments.

Such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

In many such environments, resource instances such as virtual machines are allocated to a customer (or other authorized user) for a period of time in order to process tasks on behalf of that customer. In many cases, however, a customer may not have a steady flow of work such that the customer must maintain a sufficient number of virtual machines to handle peak periods of work but will often have less than this amount of work. This can result in underutilization and unneeded expense for both the customer and the resource provider. Approaches in accordance with various embodiments can instead allocate resource instances on a task or event basis to execute a function. A resource instance can be allocated to run a function in response to a customer request or event, and once the function has completed that instance can either be made available for processing a different event or destroyed, among other such options. In either case, the customer will not be charged for more processing by the instance than was needed to run the function.

As mentioned, the game servers 518 can work with one or more input management components 536 that can determine the variance of input packet timing for various player connections. The components can determine the variance and work with one or more physics engines to determine a distribution or range of possible positions for a player-controlled gameplay element, or a position for the element to be displayed per the position, velocity, and smoothing function. The input manager 536 can work with the gaming servers 518 to adjust the hit volumes or other aspects for the player controlled elements based on the timing of packets received from the respective player machines 534. The input manager 536 in some embodiments can compare the timing data against expected or ideal timing data as may be stored for a game in a variance data store 538, or other such location, for purposes of computing the variance for the player with respect to the current gaming session.

Figure 6:
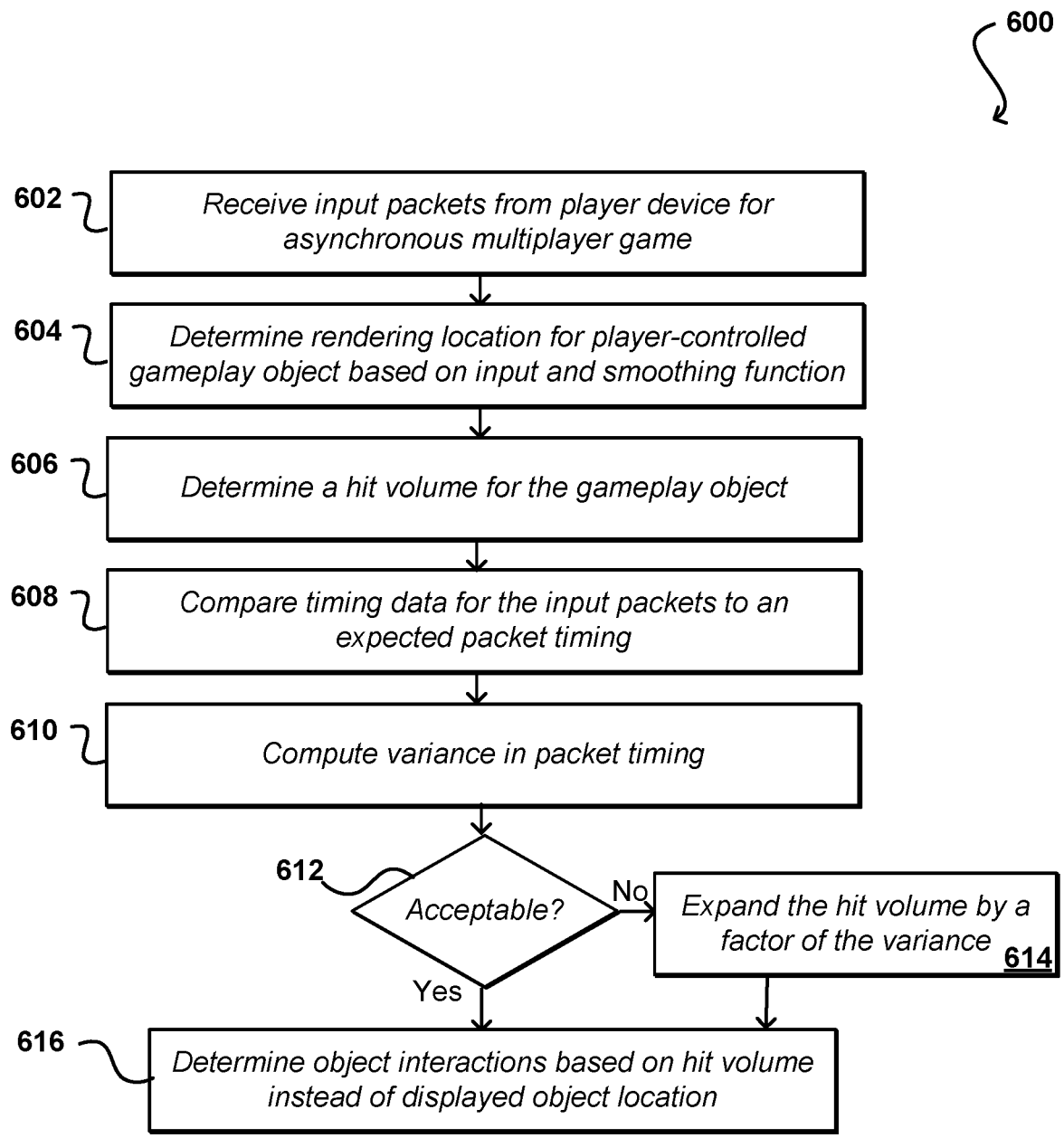
FIG. 6 illustrates an example process for adjusting a hit volume to compensate for packet timing jitter that can be utilized in accordance with various embodiments.

FIG. 6 illustrates an example process 600 for adjusting a hit volume to compensate for packet timing jitter for an asynchronous multiplayer game that can be utilized in accordance with one embodiment. It should be understood for this and other processes discussed herein that there can be additional, alternative, or fewer steps performed in similar or alternative orders, or in parallel, within the scope of the various embodiments unless otherwise stated. Further, although gaming applications are a primary example utilized herein, it should be understood that other types of applications or content can benefit from advantages of the various embodiments as well, where the users are selected from a pool of potential users for a specific session or purpose, etc. In this example, input packets are received 602 from a player device with respect to an asynchronous multiplayer game. As mentioned, for such a game a player device can be authoritative with respect to the passage of time as determined at least in part by the timing of the input packets. A rendering location can be determined 604 for a player-controlled gameplay object, such as a player avatar, depending at least in part upon the received input data as processed according to a smoothing function as discussed herein. As mentioned, the rendered and/or displayed position can vary from the actual or authoritative position data used for determining actions and occurrences within the game. A hit volume can be determined 606 for the gameplay object, which can have a size and shape based upon factors such as the size, location, shape, and velocity of movement of the player-controlled gameplay object.

Timing data can be determined for the input packets, which in some embodiments can include a time between the receipts of subsequent packets on a stream. The timing data for the input packets can be compared 608 against an expected packet timing, such as an ideal timing or an expected timing based upon current network conditions, among other such options. A variance in packet timing can then be computed 610, which can be compared against a maximum variance threshold or other such criterion. A determination can be made 612 as to whether the variance is acceptable. If not, or in some embodiments for any amount of variance, the hit volume for the object can be expanded 614 by a factor relating to, or determined according to, the computed variance. Once a final hit volume is obtained for the objet, object interactions can be determined 616 based on the hit volume instead of the displayed location of the object determined using the smoothing function. As mentioned, this can help to remove any advantage obtained through packet jitter while retaining the smooth movement and animation of objects in the game.

Figure 7:
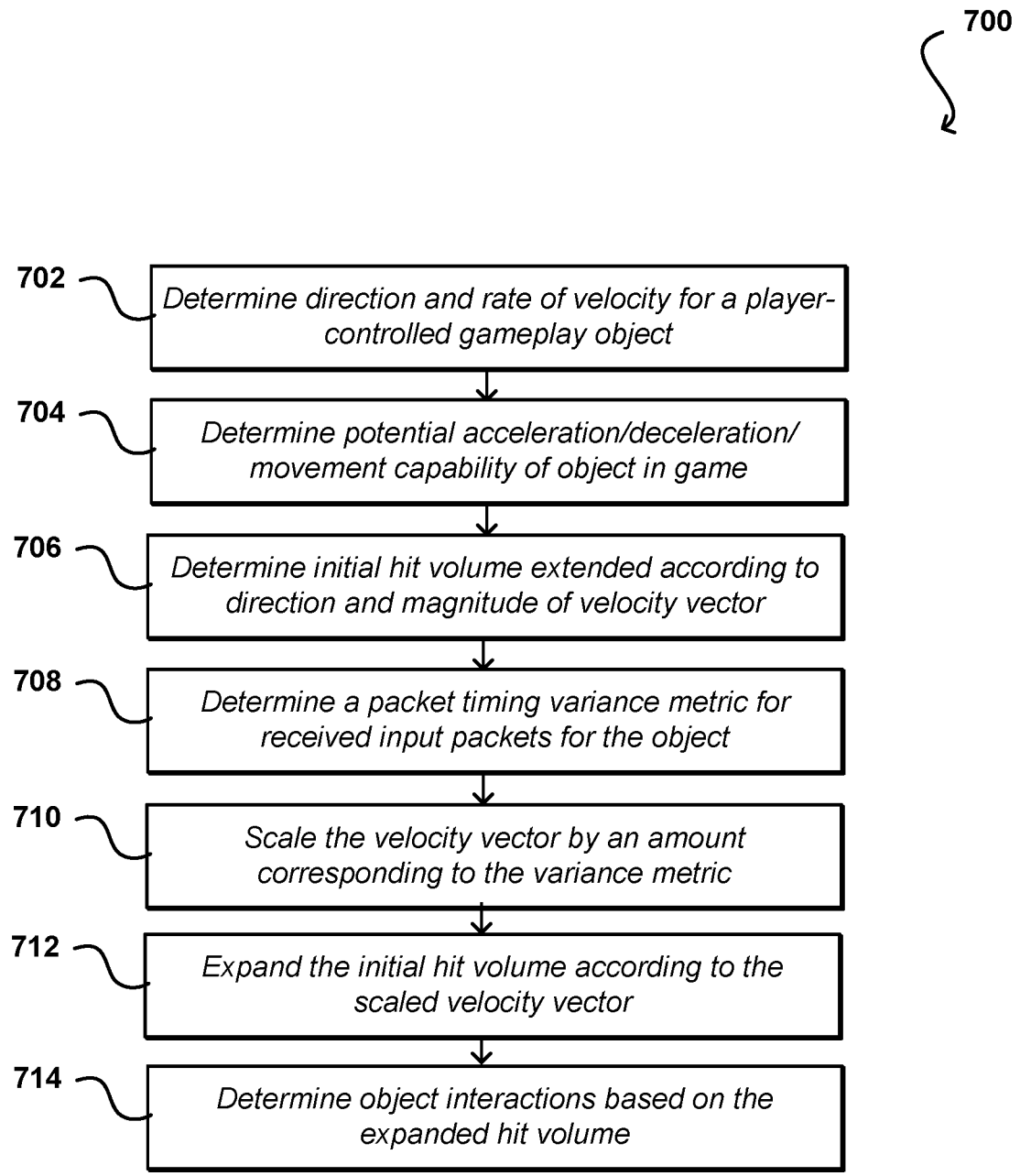
FIG. 7 illustrates an example process for determining a hit volume for a player-controlled gameplay element that can be utilized accordance with various embodiments.

FIG. 7 illustrates an example process 700 for determining hit volumes based at least in part upon input packet timing jitter that can be utilized in accordance with various embodiments. In this example, a direction and magnitude of velocity is determined 702 for a player-controlled gameplay object in an asynchronous multiplayer game. In this example, potential adjustments to that velocity can be determine 704 and considered as well, as may depend at least in part upon the potential acceleration, deceleration, and/or movement ability for the element. For example, in some games elements do not stop but are always moving or at least cannot move backwards, such as in a running game. In other games a player object might move along a rail or path that provides for limited deviation, among other such options. An initial hit volume can be determined 706 that is extended according to the direction and magnitude of a determined velocity vector for the object. A packet timing variance metric can be determined 708 for the particular gameplay object, such as is discussed with respect to the process 600 of FIG. 6. The velocity vector for the object can be scaled (i.e., increased) by an amount corresponding to the variance metric. The initial hit volume can then be expanded 712 according to the scaled velocity vector, such as by using a dot product of the vectors or other such approach discussed and suggested herein. In some embodiments, there may not be an initial hit volume determination with subsequent expansion but a single determination based upon the available velocity and variance vectors, among other such options. Once a final hit volume is obtained for the objet, object interactions can be determined 714 based on the hit volume instead of the displayed location of the object determined using the smoothing function.

Figure 8:
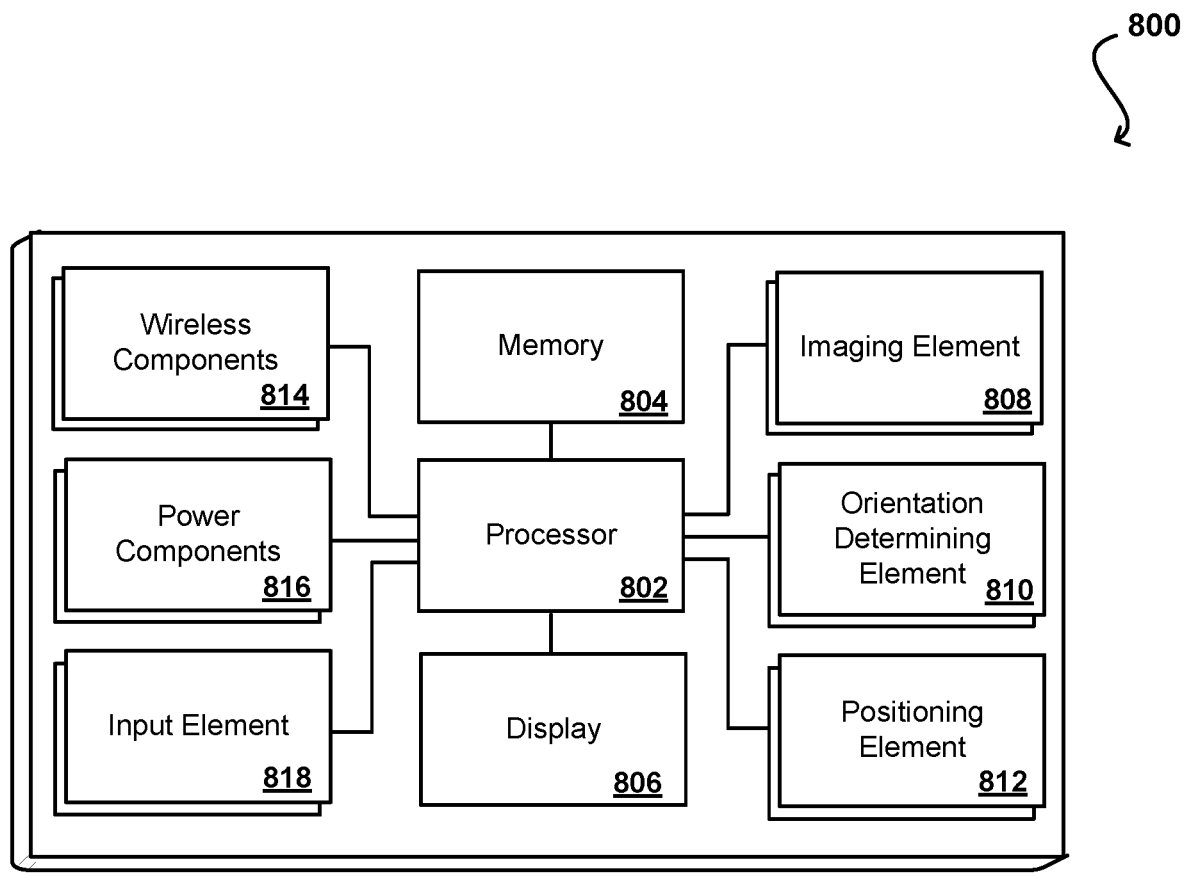
FIG. 8 illustrates example components of a computing device that can be used to implement aspects of the various embodiments.

FIG. 8 illustrates a set of basic components of an electronic computing device 800 that can be utilized to implement aspects of the various embodiments. In this example, the device includes at least one processing unit 802 for executing instructions that can be stored in a memory device or element 804. As would be apparent to one of ordinary skill in the art, the device can include many types of memory, data storage, or computer-readable media, such as a first data storage for program instructions for execution by the processing unit(s) 802, the same or separate storage can be used for images or data, a removable memory can be available for sharing information with other devices, and any number of communication approaches can be available for sharing with other devices. The device typically will include some type of display screen 806, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 808, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 800 also includes at least one orientation determining element 810 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 800. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 812 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 814 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 818 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
determining a variance between a received input frequency from a client device participating in an online game and an expected input frequency from the client device participating in the online game, wherein the expected input frequency is determined using one or more previously received inputs from the client device;
determining, based at least in part on input from the client device, a current location of a character object and a velocity of movement of the character object;
causing a location of the character object to be presented in the online game, based at least in part upon the variance, the current location, and the velocity of movement; and
causing game interactions for the character object in the online game to be based upon the presented location.

2. The computer-implemented method of claim 1, wherein the caused game interactions include at least adjusting a hit volume of the character object.

3. The computer-implemented method of claim 2, wherein the hit volume is determined based at least in part on the velocity of movement.

4. The computer-implemented method of claim 2, wherein the hit volume is adjusted by a scalar factor of the velocity of movement, the scalar factor increasing with an increase in the variance.

5. The computer-implemented method of claim 1, further comprising:
setting a sliding window of time stamps indicating a maximum allowable variance between the frequency of received input and the expected input frequency.

6. The computer-implemented method of claim 5, further comprising:
adjusting a time of receipt for an input packet, received outside of the sliding window, to be considered within the sliding window.

7. The computer-implemented method of claim 1, further comprising:
determining the expected input frequency based at least in part upon a performance of one or more network connections used to transmit input packets.

8. A system, comprising:
at least one processor; and
memory including instructions that, when executed by the at least one processor, cause the system to:
determine a variance between a received input frequency from a client device participating in an online game and an expected input frequency from the client device participating in the online game, wherein the expected input frequency is determined using one or more previously received inputs from the client device;
determine, based at least in part on input from the client device, a current location of a character object and a velocity of movement of the character object;
cause a display location of the character object to be presented in the online game, based at least in part upon the variance, the current location, and the velocity of movement; and
cause game interactions for the character object in the online game to be based upon the display location.

9. The system of claim 8, wherein the caused game interactions include at least adjusting a hit volume of the character object.

10. The system of claim 9, wherein the hit volume is determined based at least in part on the velocity of movement.

11. The system of claim 9, wherein the hit volume is adjusted by a scalar factor of the velocity of movement, the scalar factor increasing with an increase in the variance.

12. The system of claim 8, wherein the instructions, when executed, further cause the system to:
set a sliding window of time stamps indicating a maximum allowable variance between the frequency of received input and the expected input frequency.

13. The system of claim 12, wherein the instructions, when executed, further cause the system to:
adjust a time of receipt for an input packet, received outside of the sliding window, to be considered within the sliding window.

14. The system of claim 8, wherein the instructions, when executed, further cause the system to:
determine the expected input frequency based at least in part upon a performance of one or more network connections used to transmit input packets.

15. A non-transitory computer-readable storage medium storing instructions that, when executed by at least one processor of a computing device, cause the computing device to:
determine a variance between a received input frequency from a client device participating in an online game and an expected input frequency from the client device participating in the online game, wherein the expected input frequency is determined using one or more previously received inputs from the client device;
determine, based at least in part on input from the client device, a current location of a character object and a velocity of movement of the character object;
cause a display location of the character object to be presented in the online game, based at least in part upon the variance, the current location, and the velocity of movement; and
cause game interactions for the character object in the online game to be based upon the display location.

16. The non-transitory computer-readable storage medium of claim 15, wherein he caused game interactions include at least adjusting a hit volume of the character object.

17. The non-transitory computer-readable storage medium of claim 16, wherein the hit volume is adjusted by a scalar factor of the velocity of movement, the scalar factor increasing with an increase in the variance.

18. The non-transitory computer-readable storage medium of claim 15, wherein the instructions, when executed, cause the computing device to:
set a sliding window of time stamps indicating a maximum allowable variance between the frequency of received input and the expected input frequency.

19. The non-transitory computer-readable storage medium of claim 18, wherein the instructions, when executed, cause the computing device to:
adjust a time of receipt for an input packet, received outside of the sliding window, to be considered within the sliding window.

20. The non-transitory computer-readable storage medium of claim 15, wherein the instructions, when executed, cause the computing device to:
determine the expected input frequency based at least in part upon a performance of one or more network connections used to transmit input packets.

\* \* \* \* \*